Jan. 19, 1965 R. D. DUNCAN 3,165,835
APPARATUS FOR CHECKING THE ALIGNMENT OF VERTICAL CHANNELS
Filed Nov. 19, 1962 4 Sheets-Sheet 1
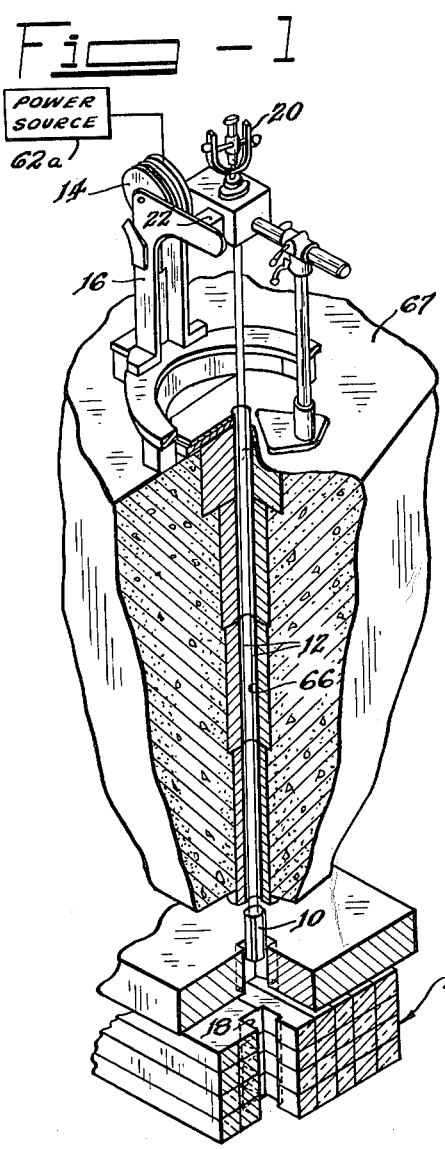
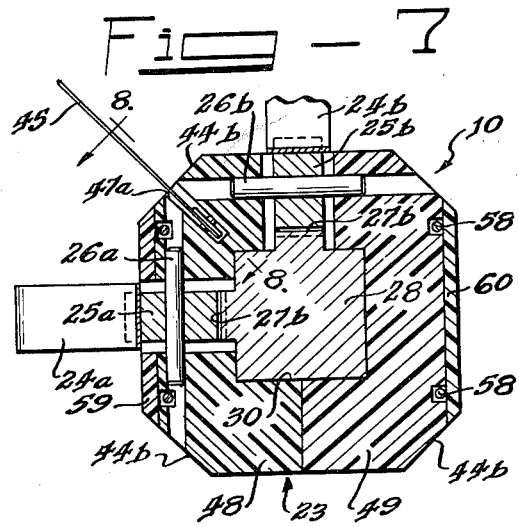
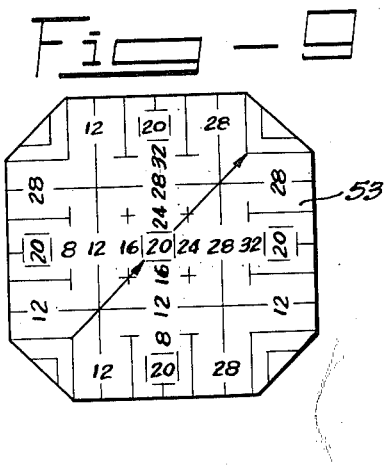
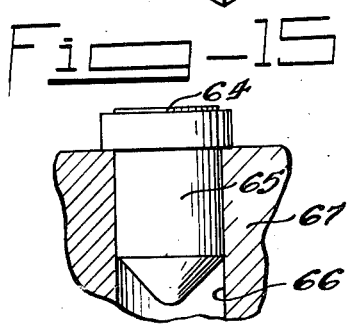
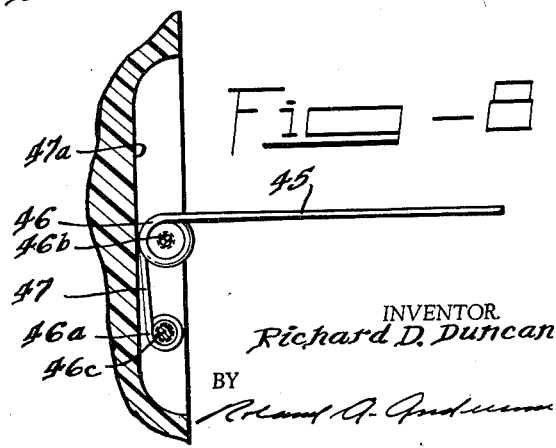
INVENTOR.
Richard D. Duncan
BY
Attorney

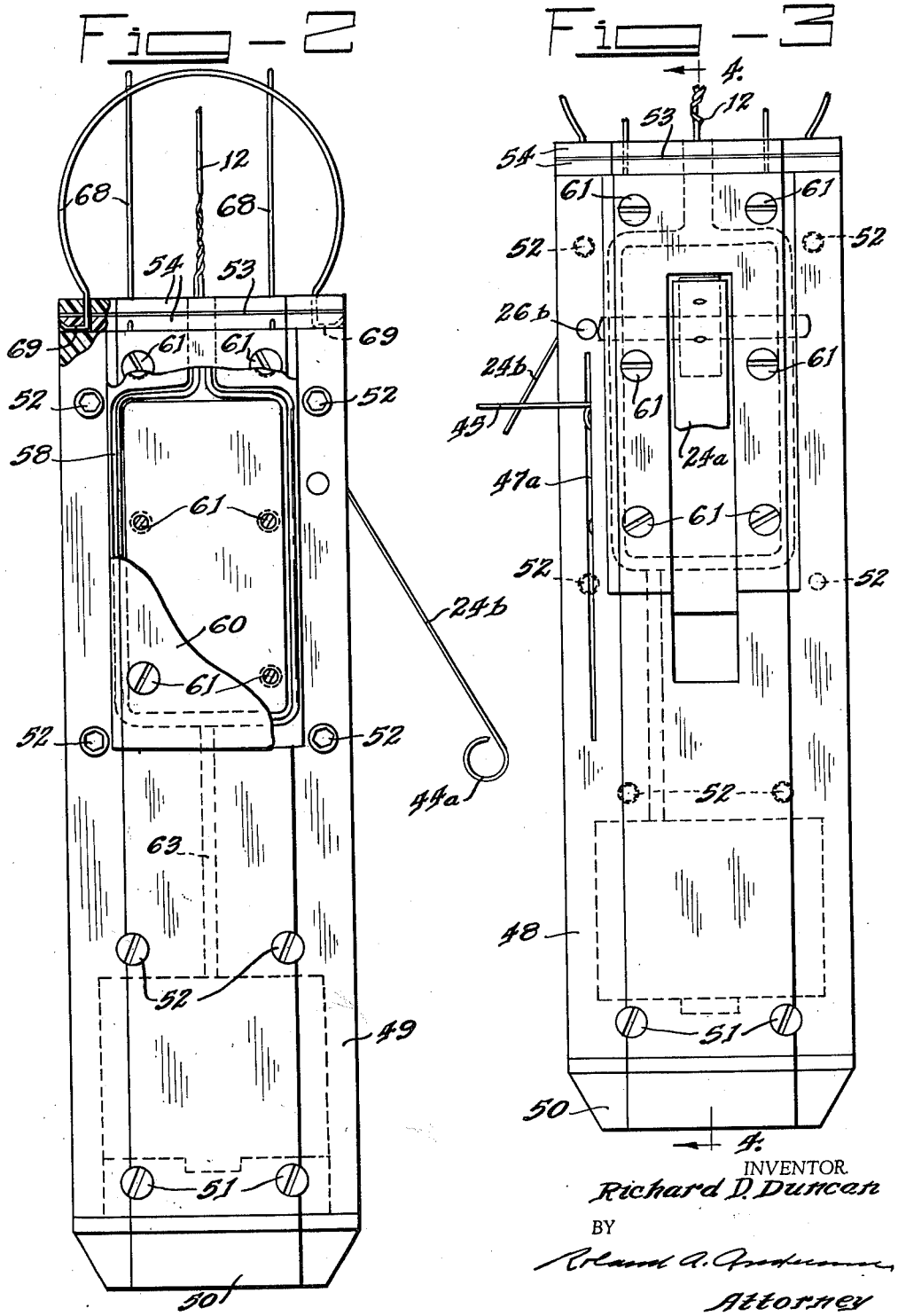

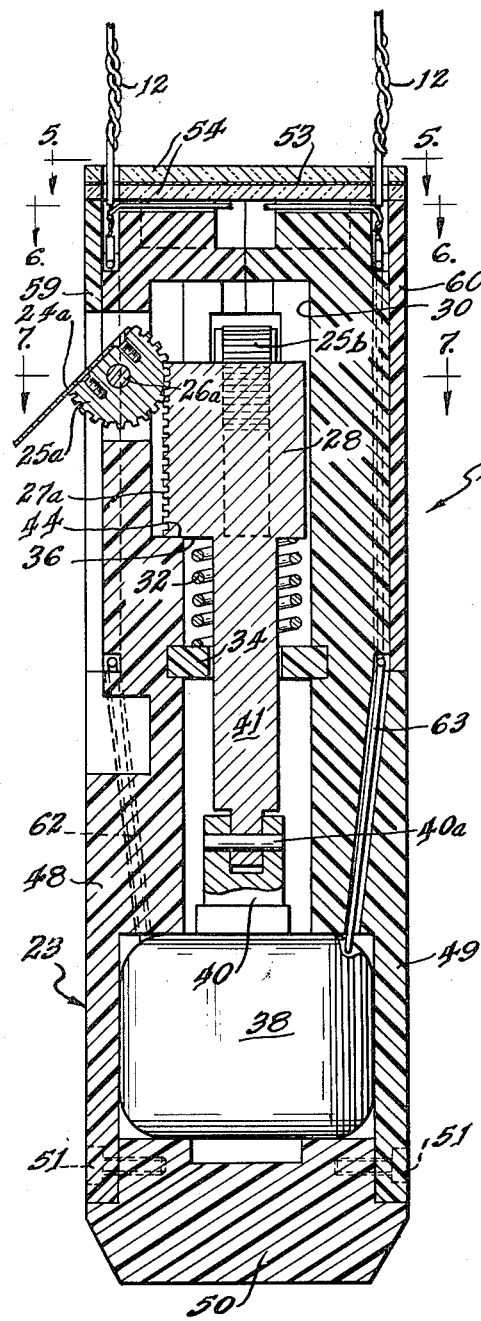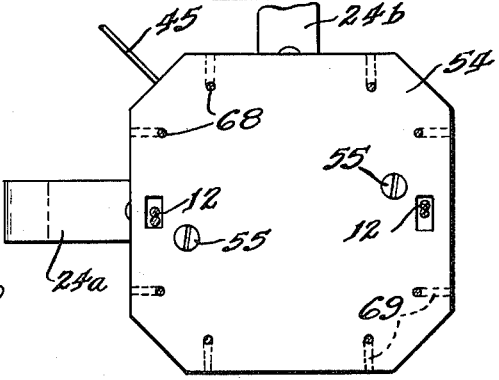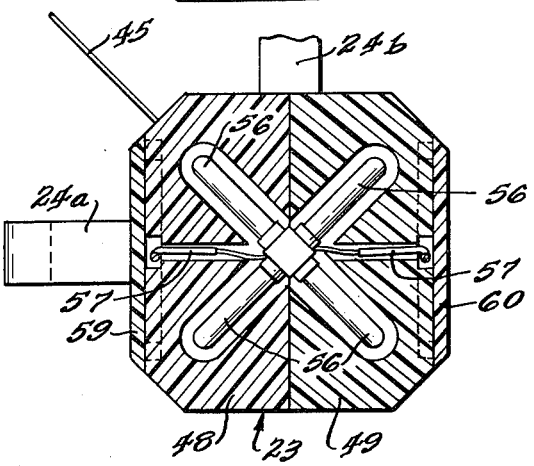

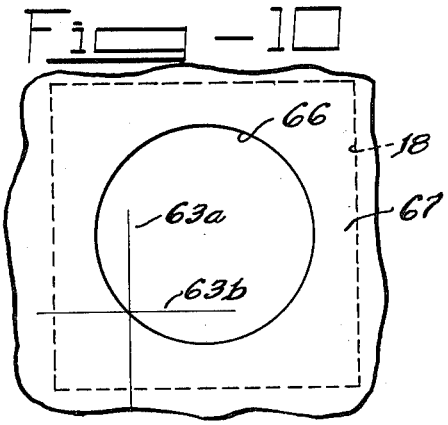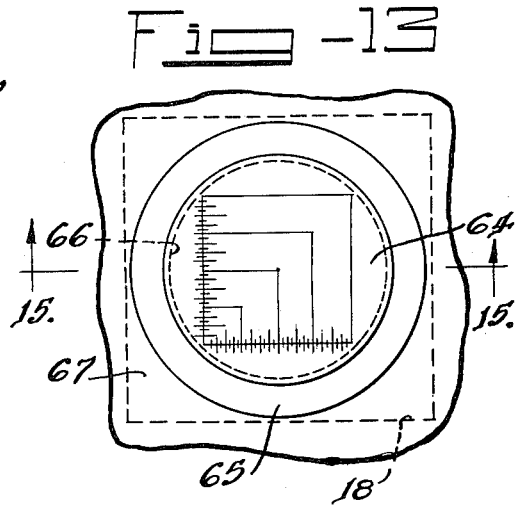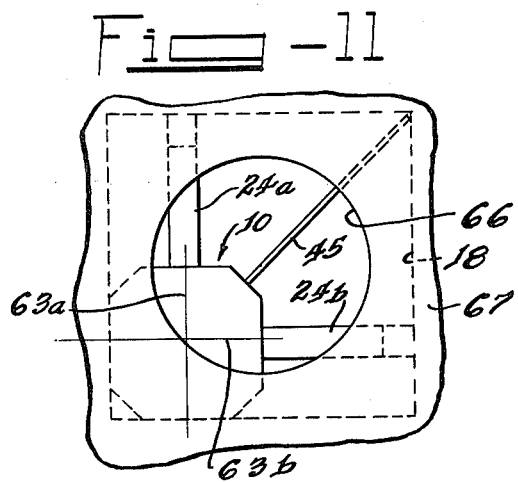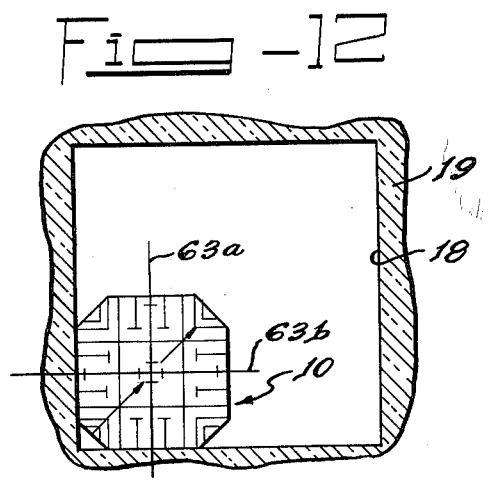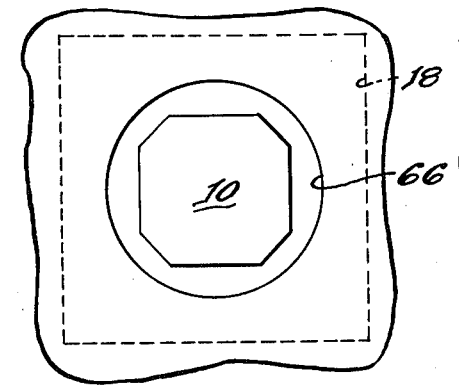

United States Patent Office 3,165,835
Patented Jan. 19, 1965

3,165,835
APPARATUS FOR CHECKING THE ALIGNMENT OF VERTICAL CHANNELS
Richard D. Duncan, Richland, Wash., assignor to the United States of America as represented by the United States Atomic Energy Commission
Filed Nov. 19, 1962, Ser. No. 238,811
8 Claims. (Cl. 33—46)

This invention relates generally to the alignment of rectangular vertical channels and, more specifically, to a means of determining the amount of distortion of the walls of control or safety rod channels that is produced by the operation of a nuclear reactor.

Because of the heat and high neutron density present in an operating nuclear reactor, stresses are often put on the channels used to guide control and safety rods through the moderator to their effective positions in the reactor core. It is often desirable to make a measurement of the amount of this distortion so that it may be determined when it is necessary to replace these channels or to do minor maintenance work on the reactor. Furthermore, distortion data may be used to predict future reactor moderator distortion and in the design of channel liner and flexible safety rods to combat this problem.

Because of the difficulty presented in obtaining an accurate picture of the interior walls of a lengthy channel, a problem is presented in how distortion measurements should be made. In the case of a nuclear reactor, an additional difficulty is presented if these channels lead to a core which is still hazardously radioactive.

It is therefore an object of this invention to overcome the difficulties encountered in ascertaining the misalignment or distortion of safety or control rod channels in a nuclear reactor.

It is another object of this invention to provide a means of measuring such distortion from a point that is relatively remote from the active zone of the reactor.

It is still another object of this invention to provide a means of measuring any irregularities in rectangular vertical channels due to manufacturing flaws, operational stresses, breakdown of the material or other causes.

Other objects will become apparent as the detailed description proceeds.

In the drawings:

FIG. 1 is a perspective diagrammatic view, with parts broken away, showing the apparatus of the present invention being used to measure the sides of a channel;

FIG. 2 is an elevation of the target device of the present invention taken from one side;

FIG. 3 is an elevation of the target device taken from the opposite side;

FIG. 4 is a longitudinal section taken on the line 4—4 of FIG. 3;

FIG. 5 is a top view of the target device taken on the line 5—5 of FIG. 4;

FIG. 6 is a horizontal section taken on the line 6—6 of FIG. 4 to show the target lamps;

FIG. 7 is a horizontal section taken on the line 7—7 of FIG. 4 to show the actuation of positioning arms of the target device;

FIG. 8 is a fragmentary vertical section taken on the line 8—8 of FIG. 7 to illustrate a bumper associated with the target device;

FIG. 9 is a plan view of a target used with the target device;

FIG. 10 is a fragmentary plan view, partly schematic, showing the positioning of transit cross hairs with respect to a reactor hole to be measured;

FIG. 11 is a fragmentary plan view, partly schematic, showing how the target device is pushed into the corner of the reactor hole to be measured;

FIG. 12 is a fragmentary horizontal section, partly schematic, showing the relationship of the transit cross hairs to the target device when pushed into the corner of the reactor hole;

FIG. 13 is a fragmentary plan view showing a target for positioning the transit cross hairs;

FIG. 14 is a fragmentary plan view, partly schematic, showing the target device being moved through a shield hole into the reactor hole; and FIG. 15 is a vertical section taken on the line 15—15 of FIG. 13.

Referring to FIG. 1, it can be seen that this invention comprises a target device 10 suspended by two cables 12 wound on a double reel 14 which is attached to a device 16 used to mount the apparatus over a vertical reactor channel 18 of rectangular shape to be observed. Channel 18 is shown as a safety rod channel extending into the core of a nuclear reactor 19. A vertical line of sight down channel 18 is obtained by a transit 20 positioned upon mounting device 16. A digital counter 22 may be used as a convenient device for indicating the amount of the cables 12 that has been unreeled from the reel 14. Thus it can be seen from FIG. 1 that the invention in general comprises apparatus whereby a vertical line of sight is established down a vertical channel in which the target device 10 to be hereinafter described is used as an indicating device for ascertaining channel distortion.

As shown in FIGS. 4 and 7, the target device 10 comprises a body 23 and two arms 24a and 24b pivotally mounted in the body 23 by pinion gears 25a and 25b and shafts 26a and 26b carrying the pinion gears. The body 23 carries the shafts 25a and 26b, and the arms 24a and 24b are fixed to flattened sides of gears 25a and 25b where there are no teeth. Said gears engage racks 27a and 27b attached to two sides of a member 28, which is positioned in a longitudinal channel 30 in the body 23. The member 28 is urged to its uppermost position in channel 30 by a coiled helical spring 32. Spring 32 bears upon a collar 34 lodged in the body 23 and a shoulder 36 of member 28. This action of spring 32 holds the arms 24a and 24b in retracted vertical position.

A solenoid 38 is mounted in the lower portion of body 23 and has an armature 40 connected by a pin 40a to an extension 41 of the member 28 which projects through the spring 32 and collar 34. When the solenoid 38 is energized, the armature 40 pulls downwardly upon the member 28 against the action of spring 32 and lowers the member 28 to its lowermost position, shown in FIG. 4, in which the shoulder 36 of the member 28 engages a shoulder 44 formed in the body 23. When the member 28 is in its lowermost position, the arms 24a and 24b extend at an angle to the vertical and protrude from the body 23, as shown in FIGS. 4 and 7. Each of the arms 24a and 24b is thin and spring-like and has at its outer free end, as shown in FIG. 2 for the arm 24b, a loop 44a which prevents the arm from digging into the sides of the channel 18.

As shown in FIGS. 6, 7, and 8, the body 23 has the cross-sectional shape of a square with flattened corners 44b. As shown in FIG. 7, the gear shafts 25a and 25b are perpendicular to one another, and the arms 24a and 24b are located in adjacent sides of the body 23 in retracted position and protrude therefrom in extended position.

As shown in FIGS. 5 and 7, a yieldable wire bumper 45 protrudes horizontally from the flattened corner 44b of the body 23 which lies between the arms 24a and 24b. As shown in FIG. 8, the bumper 45 has two coiled portions 46 and 46a which loosely receive screws or pins 46b and 46c secured to the body 23. The coiled portions 46 and 46a and a vertical portion 47 interconnecting them are located in a recess 47a formed in the body 23 at the flattened corner 44b.

The body 23, which may be of an acrylic resin, is formed of mating halves 48 and 49 and a bottom insert or plug 50, as shown in FIG. 4. As shown in FIGS. 2, 3, and 4, screws 51 secure the halves 48 and 49 to the plug 50. As shown in FIGS. 2 and 3, screws 52 secure the halves 48 and 49 to one another. The other parts such as the arms 24a and 24b, gears 25a and 25b, shafts 26a and 26b, member 28, solenoid 38, and armature 40, are metallic.

A sealed target 53, which is shown in detail in FIG. 9, is secured, as shown in FIGS. 4, 5, and 6, between transparent strips 54 to the upper end of the body 23 by screws 55 and is illuminated by four lamps 56 set in recesses formed in the upper end of the body 23.

The lamps 56 are electrically connected by wires 57 with rectangular loops 58, which are set in recesses in the outer sides of the body halves 48 and 49 and retained therein by cover plates 59 and 60, which are formed of the same material as the body 23 and are attached to the body halves 48 and 49, respectively, by screws 61. The cover plate 59 is U-shaped so as to have an opening through which the arm 24a may be moved. The cover plate 60 is rectangular. The loops 58 are electrically connected by wires 62 and 63 with the solenoid 38. The loops 58, which are formed as ends of the cables 12, support the body 23 on the cables as well as electrically connecting the lamps 56 and solenoid 38 through the wires 57, 62, and 63 with the cables 12, which are connected with an electrical source of power 62a, which may be considered a remotely controlled means for lighting the lamps 56 and actuating the solenoid 38.

The transit 20 is so positioned that in the line of vertical sight its cross hairs 63a and 63b, shown in FIG. 10, are coincident with centerlines of the target 53 when the target device 10 is pushed into a corner of the reactor channel 18 by the arms 24a and 24b, as shown in FIGS. 11 and 12. The transit cross hairs 63a and 63b are made coincident with the theoretical position of the centerlines of the target 53 when pushed into the corner of the reactor channel 18 by being aligned with the two scaled sides of a target 64, which, as shown in FIGS. 13 and 15, is fixed to a circular plug 65 mounted in a circular hole 66 in a shield 67 associated with the nuclear reactor 19, as shown in FIG. 13. The circular hole 66 in the shield is aligned with the reactor channel 18 in the reactor 19, the condition of which hole is to be determined by the novel apparatus of the present invention. Now, when the plug 65 is removed from the shield hole 66, and the target device 10 is lowered through the shield hole 66 into the reactor channel 18, as shown in FIG. 14, and then brought against two sides of the reactor hole, as shown in FIG. 11, by the arms 24a and 24b and the bumper 45, the target 53, carried by the target device 10, is centered at the intersection of the transit cross hairs 63a and 63b provided the reactor channel 18 is aligned with the circular hole 66. Any shift of the sides of the reactor channel 18 from the position theoretically required for alignment of the reactor channel 18 with the shield hole 66 is obtained from readings of the transit cross hairs 63a and 63b on the target 53. It will be understood that the sides of the reactor channel 18 may shift, since the opening is formed between graphite blocks arranged in layers in the reactor 19.

The significant feature of the novel apparatus of the present invention is that the target device 10 with its target 53 is shifted to a corner of the reactor channel 18 through an electrical operation of the arms 24a and 24b, which operation also lights up the target 53 so that the position of the transit cross hairs 63a and 63b in the target can be read. The bumper 45 assures that the target device 10 is always forced into the same corner of the reactor channel 18 so that the same two sides thereof are always read.

The upper end of the target device 10 is provided with four arcuate wire bails 68, which are soldered to one another at crossing portions and have hooked ends extending through the target 53 and plates 59. The bails 68 keep the target 10 from being hooked under a ledge or projection.

The intention is to limit the invention only within the scope of the appended claims.

What is claimed is:

1. A device for checking the alignment of rectangular vertical channels comprising: a body; means for freely suspending said body at a desired level in said channel; two arms connected to said body; solenoid actuated means for maintaining said arms in contact with adjacent sides of said channel; remotely controlled means for energizing said solenoid; means for maintaining said arms out of contact with said channel when said contact maintaining means is not actuated; a scaled target mounted on a side of said body exposed to vertical view; means for illuminating said target; and means for fixing a line of sight through said channel intersecting said target.

2. The device according to claim 1, further including means for preventing rotation of said body when said arms are out of contact with said channel.

3. A device for checking the alignment of rectangular vertical channels comprising: a body; means for freely suspending said body at a desired level in said channel; two arms, one end of each being pivotally attached to said body; solenoid actuated means for maintaining the other ends of said arms in contact with adjacent sides of said channel when said solenoid is energized; remotely controlled means for energizing said solenoid; spring means for maintaining said arms out of contact with said channel when said solenoid is not energized; a scaled target mounted on a side of said body exposed to vertical view; means for illuminating said target; and means for fixing a line of sight through said channel intersecting said target.

4. The device according to claim 3, further including means for preventing rotation of said body when said arms are out of contact with said channel.

5. A device for checking the alignment of rectangular vertical channels comprising: a body capable of being lowered by gravity into said channel and having horizontal dimensions well within the clearance afforded by the horizontal dimensions of said channel; means for freely suspending said body at a desired vertical level in said channel; a first arm, one end thereof being pivotally attached to said body, the other end thereof being operable to contact one side of said channel at an angle having a horizontal component normal to said channel side; a second arm, one end thereof being pivotally attached to said body, the other end thereof being operable to contact another side of said channel at an angle having a horizontal component normal to said channel side, said channel side contacted by said second arm being adjacent to the side contacted by said first arm; spring means for restraining said first and second arms out of contact with said channel sides; solenoid actuated means operating against said spring means for rotating said arms in a direction tending to maintain said arms in contact with said channel when said solenoid is energized; remotely controlled means for energizing said solenoid; a scaled target mounted on a side of said body exposed to vertical view; means for illuminating said target; and means for fixing a vertical line of sight through said channel intersecting said target.

6. The device according to claim 5, further including means for preventing rotation of said body when said arms are out of contact with said channel.

7. A device for checking the alignment of rectangular vertical channels comprising: a body capable of being lowered by gravity into said channel and having horizontal dimensions well within the clearance afforded by the horizontal dimensions of said channel; means for freely suspending said body at a desired vertical level in said channel; a first pinion gear rotatably mounted on said body; a first arm having a vertical and an approximately horizontal position, one end thereof being attached to said first pinion gear so as to allow rotation of said arm in a vertical plane, the other end of said arm being contactable with one side of said channel when said arm is rotated from said vertical to said approximately horizontal position; a second pinion gear rotatably mounted on said body; a second arm having a vertical and an approximately horizontal position, one end thereof being attached to said second pinion gear so as to allow rotation of said arm in a vertical plane, the other end of said arm being contactable with a side of said channel adjacent to the side contacted by said first arm when said second arm is rotated from said vertical to said approximately horizontal position; a spring biased rack slidably mounted on said body and engageable with said first and second pinion gears for simultaneously holding said first and second arms in said vertical position; a solenoid mounted to said body, the operating rod thereof being connected to said rack, said solenoid being adapted when energized to operate said rack against said spring biasing to simultaneously rotate said first and second arms to said approximately horizontal positions; remotely controlled means for energizing said solenoid; a scale target mounted on a side of said body exposed to vertical view when said body is a said channel; means for illuminating said target; means for fixing a vertical line of sight through said channel intersecting said target; and means for preventing rotation of said body when said arms are in said vertical position.

8. The device according to claim 7, wherein said means for preventing rotation of said body when said arms are vertical comprises a yieldable guiding arm, one end thereof being connected to said body and the other end thereof being adapted to ride in contact with a corner of said channel.

References Cited by the Examiner
UNITED STATES PATENTS

| | | | |
|---|---|---|---|
| 1,035,426 | 8/12 | Dixon. | |
| 1,662,836 | 3/28 | Steinle | 33—46 X |
| 2,198,837 | 4/40 | Morgan | 33—46.2 |
| 2,548,861 | 4/51 | Brown | 33—46.2 |
| 2,702,945 | 3/55 | Reeves | 33—46.2 |

ROBERT B. HULL, *Primary Examiner.*